E. T. TURNER

Aug. 1, 1933. WATER SOFTENING APPARATUS Re. 18,909

Original Filed July 9, 1925 4 Sheets-Sheet 1

INVENTOR.
E. T. TURNER.

ATTORNEY.

E. T. TURNER

Aug. 1, 1933. WATER SOFTENING APPARATUS Re. 18,909

Original Filed July 9, 1925 4 Sheets-Sheet 2

E. T. TURNER

Aug. 1, 1933. WATER SOFTENING APPARATUS Re. 18,909

Original Filed July 9, 1925 4 Sheets-Sheet 3

INVENTOR.
E. T. TURNER.
By Edmund Reed
ATTORNEY.

E. T. TURNER

Aug. 1, 1933. WATER SOFTENING APPARATUS Re. 18,909

Original Filed July 9, 1925 4 Sheets-Sheet 4

INVENTOR.
E. T. TURNER.

Edward Reid

ATTORNEY.

Reissued Aug. 1, 1933

Re. 18,909

UNITED STATES PATENT OFFICE 18,909

WATER SOFTENING APPARATUS

Edward T. Turner, Dayton, Ohio

Original No. 1,763,727, dated June 17, 1930, Serial No. 42,453, July 9, 1925. Application for reissue June 15, 1933. Serial No. 676,023

41 Claims. (Cl. 210—24.)

This invention relates to water softening apparatus and more particularly to that type of water softening apparatus which employs as the water softening agent a material having the property of exchanging its normal base for the substances which harden the water. In a water softening device of this character the water softening material, which is usually zeolite, glauconite or some similar mineral, gradually loses its softening properties as the exchange of bases progresses and it is necessary at intervals to recondition the material by subjecting it to the action of a regenerating solution, such as brine, which will displace the substances taken up thereby and restore its normal base. This reconditioning of the water softening material not only interrupts the supply of soft water but it requires frequent attention on the part of the operator in order that the supply of soft water may be maintained.

One object of the present invention is to provide a water softening apparatus in which a continuous supply of soft water may be maintained.

A further object of the invention is to provide a water softening apparatus comprising a plurality of units which are reconditioned successively so that while a part of them are being reconditioned the other units are delivering soft water to the service line.

A further object of the invention is to provide such an apparatus in which the softening units will be stationary and the devices for delivering regenerating solution to the units and conveying the same therefrom will be moved into operative relation to the several units successively.

A further object of the invention is to provide an apparatus of this character which will maintain a reserve supply of soft water and the delivery of water to be softened to the softening units will be controlled automatically according to the quantity of softened water on hand.

Other objects of the invention will appear as the apparatus is described in detail.

Figure 1:
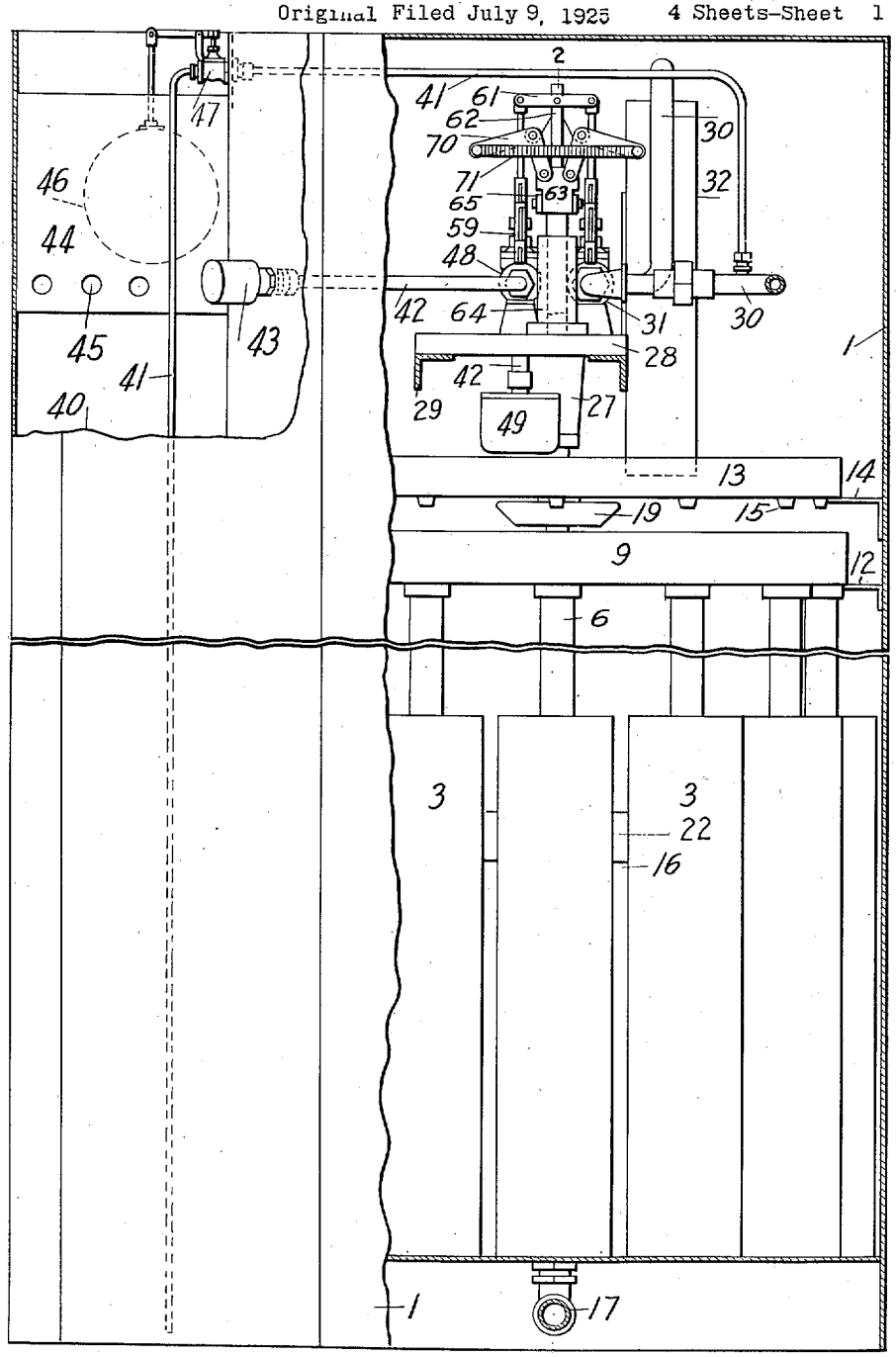
Figure 2:
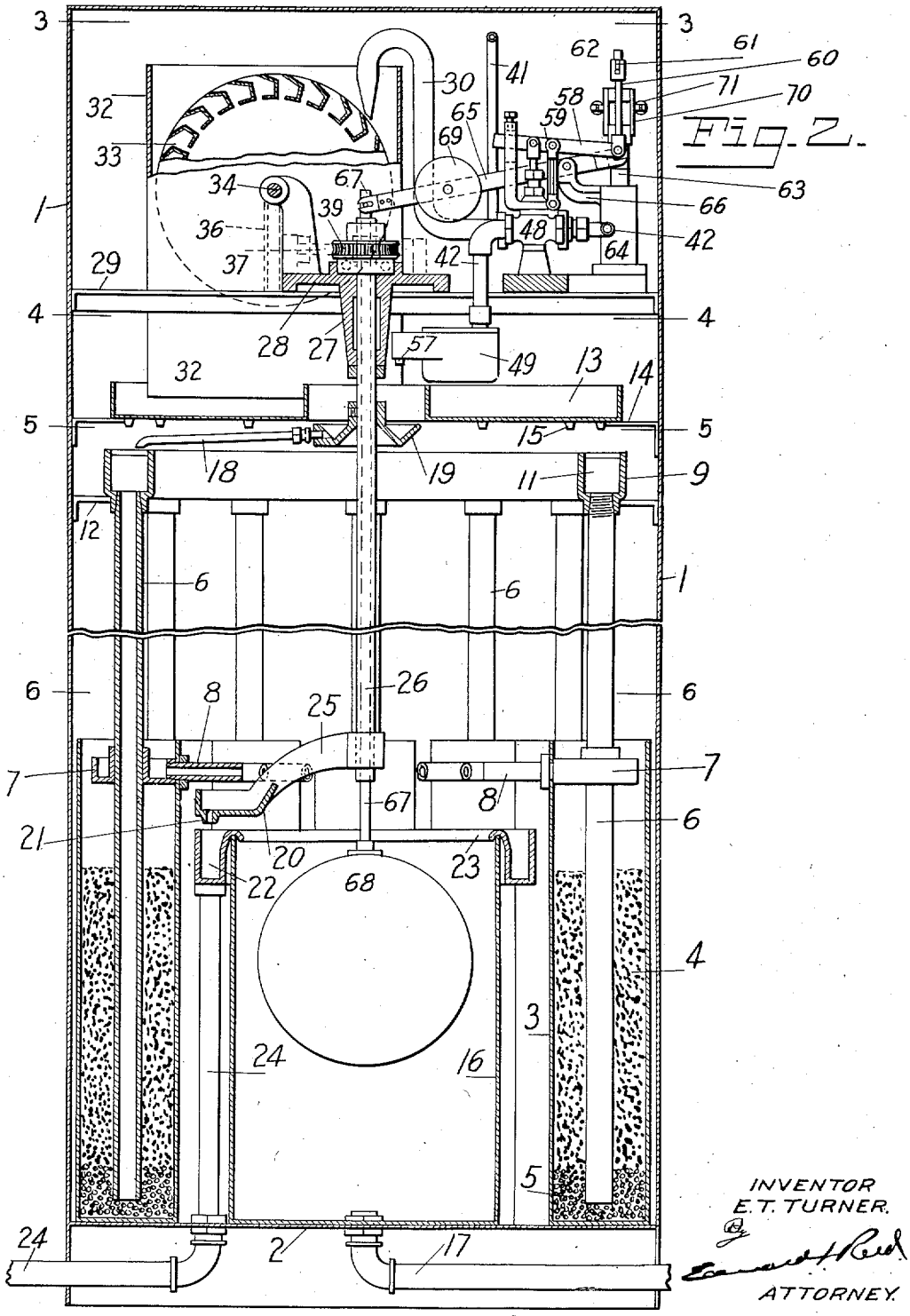
Figure 3:
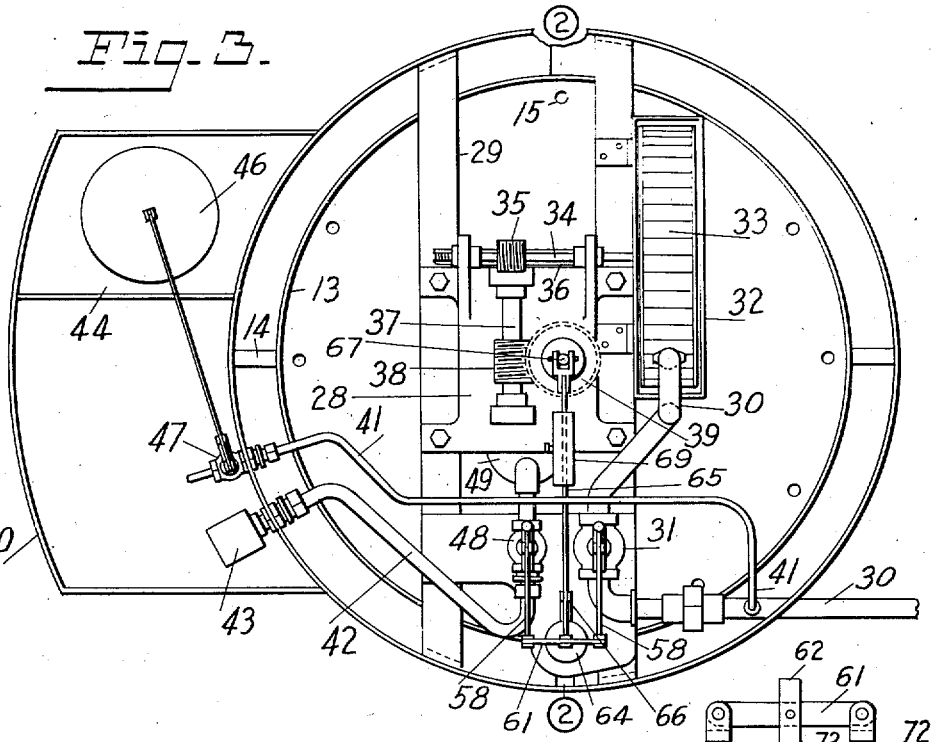
Figure 4:
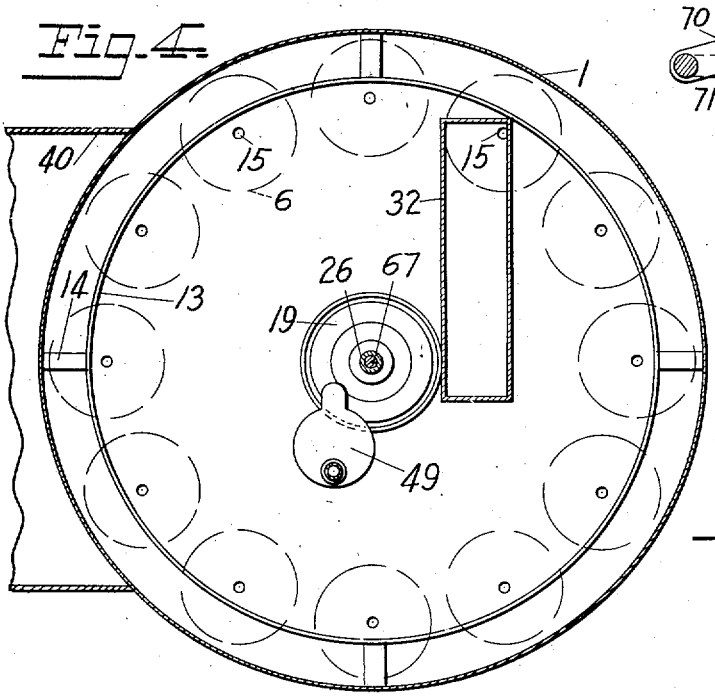
Figure 5:
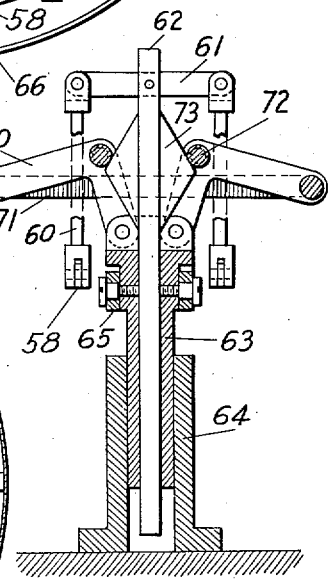
Figure 5:
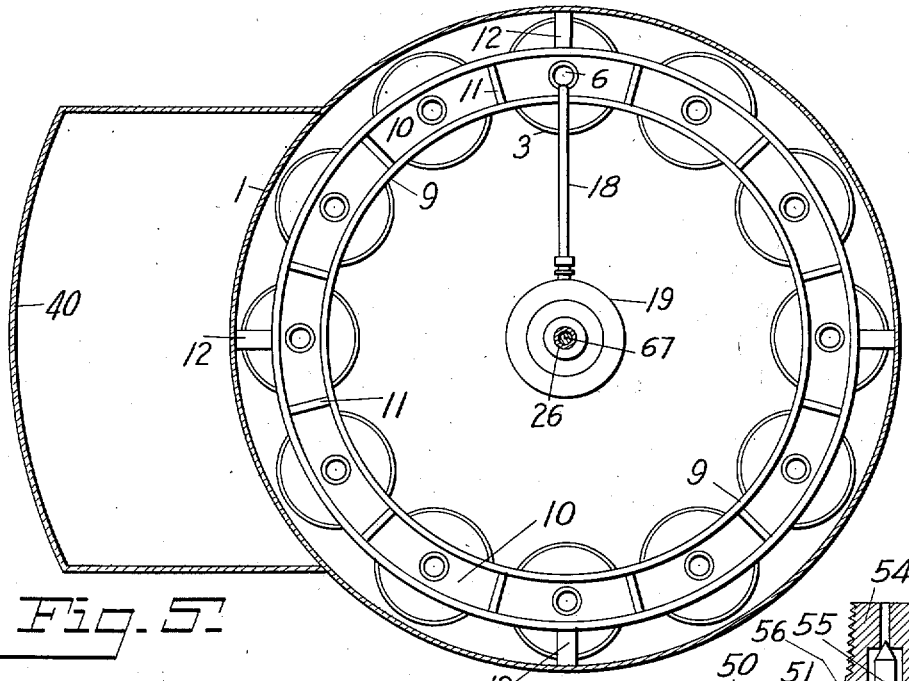
Figure 6:
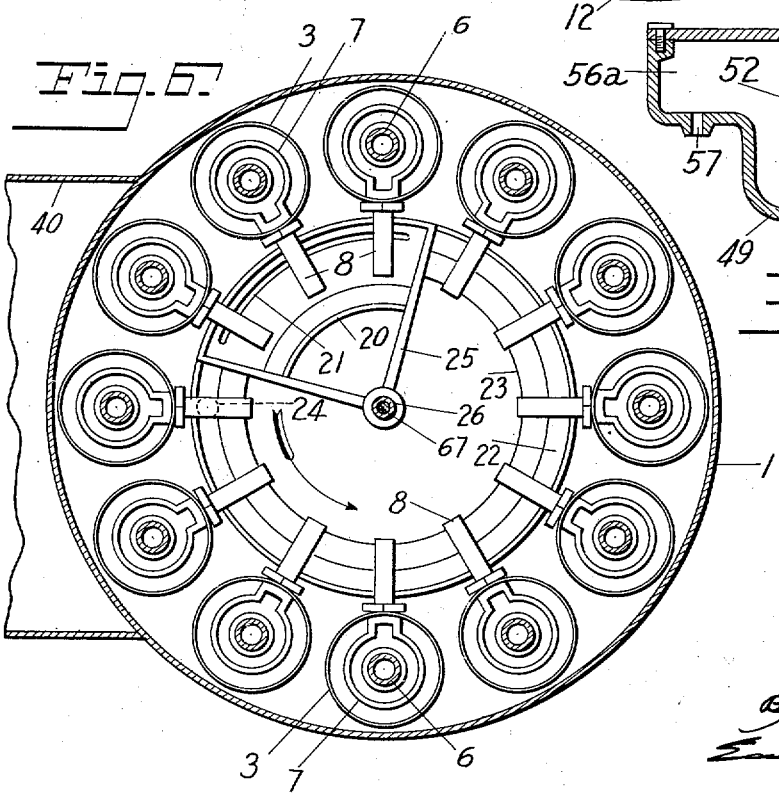
Figure 7:
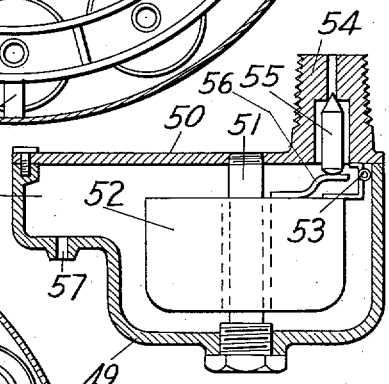

In the accompanying drawings Fig. 1 is a side elevation of a water softening apparatus embodying my invention, partly broken away to show the interior parts in elevation; Fig. 2 is a vertical sectional view taken on the line 2—2 of Fig. 1; Fig. 3 is a section taken on the line 3—3 of Fig. 2; Fig. 4 is a section taken on the line 4—4 of Fig. 2; Fig. 5 is a section taken on the line 5—5 of Fig. 2; Fig. 6 is a section taken on the line 6—6 of Fig. 2; Fig. 7 is a vertical sectional view of the device for delivering regenerating solution to the apparatus; and Fig. 8 is a vertical sectional view of the valve actuating device.

In these drawings I have illustrated one embodiment of my invention and have shown the apparatus as enclosed within a casing 1 which may, if desired, be cylindrical in form. Mounted in the lower portion of this cylinder and, in the present instance, resting upon the bottom wall 2 thereof, are a series of containers for water softening material, which, as shown at 3, are cylindrical in form, are closed at their lower ends and are open at their upper ends. Each container contains a quantity of water softening material 4 which preferably rests upon a bed of gravel 5 arranged in the bottom of the container. Extending into each container is a supply pipe 6 for delivering hard water thereto and, in the present instance, this supply pipe extends through the open upper end of the container to a point near the bottom thereof where the discharge end of the pipe is surrounded by the gravel 5. The water discharged from the pipe 6 passes upwardly through the water softening material 4 and is discharged from the upper portion of the container. As here shown, I have mounted in the upper portion of each container an outlet trough or overflow receptacle 7, which may, if desired, be supported by the supply pipe 6, and has its upper edge spaced a short distance below the upper end of the container so that as the water rises in the container it will overflow the outer wall of the outlet trough and enter that trough, from which it will flow through an outlet pipe 8 to the point of discharge, this pipe 8 extending through the wall of the container and into the outlet trough. In the present device the several containers 3, each of which with its associated parts constitutes a water softening unit, are arranged in annular formation about the wall of the cylindrical casing 1 and the several supply or inlet pipes 6 project some distance above the upper ends of the containers and are connected with an annular supply device 9, here shown in the form of a trough, which is preferably divided into a series of compartments 10, by means of partitions 11, there being one such compartment for each supply pipe 6 and the several supply pipes communicating with the respective compartments through the bottom walls thereof. In the arrangement shown, the supply pipe is screwed into the bottom wall of the device 9 which constitutes a support therefor, the device itself being mounted on brackets 12 rigidly secured to the casing 1. Water may be supplied to the several compartments 10 of the supply device 9 in any suitable manner but preferably a distributor, such as a shallow vessel 13 is supported above the same on brackets 14 carried by the casing 1. This vessel is provided in its bottom wall with a series of discharge openings which terminate in nipples 15, these nipples being arranged in annular formation above the supply device 9 and being spaced apart so that one nipple or outlet will discharge into each compartment 10 of the supply device. Hard water may be delivered to the distributor vessel 13 from a suitable source of supply and this water passes from the distributor or to the supply device 9, through the various compartments thereof to the water softening units and is discharged in a softened condition from the water softening units through the pipes 8 into a soft water receptacle or tank 16, which is here shown as arranged within the annular series of water softening units and as of a height somewhat less than the height of those units so that the discharge pipes 8 of the several units project above and discharge into this tank. The tank is connected at its bottom with a service pipe 17. When the apparatus as a whole is mounted in an elevated position the soft water will flow through the service line and distributing system by gravity, or if it is not desired to mount the apparatus in an elevated position any suitable means of distributing the soft water may be employed.

In order to subject the several water softening units successively to the action of a regenerating solution I have provided means for successively delivering the regenerating solution, such as salt water, to the several compartments 10 of the annular supply device 9, the solution being of such strength that when mixed with the water it will have the proper action upon the water softening material. As here shown, the salt solution is delivered to the compartments of the device 9 by means of a pipe 18 which extends from an annular trough or delivery device 19 and has its discharge end overhanging the annular device 9. The trough or delivery device 19 is rotatably mounted so that the pipe 18 will move slowly over the annular device 9 and will discharge the salt water successively into the several compartments thereof. The salt water which is discharged into the several compartments of the supply device 9 passes downwardly through the respective supply pipes 6 and thence upwardly through the water softening material. 4. It is, of course, important that none of the regenerating solution should enter the soft water tank 16 and I have therefore provided a discharge trough 20 which is mounted for movement into a position beneath the discharge pipes 8 of those water softening units which are undergoing the reconditioning process. This trough is provided in its bottom wall with a discharge opening 21 which, in the present instance, discharges into an annular vessel or drain trough 22, arranged about the upper end of the soft water tank 16, and, as here shown, having its inner edge turned inwardly and downwardly, as shown at 23, to provide means for supporting the trough on the tank 16. This drain trough communicates with a waste pipe 24 through which the salt solution is conducted to a suitable point of discharge. The discharge trough 20 is rotated in timed relation to the salt solution pipe 18 and is maintained in such relation to that pipe that it will be in a position to receive the liquid discharged from each unit during the latter part of the period that the salt supply pipe 18 is delivering salt solution to the compartment 10 of the supply device which is connected with that particular unit and for such further period of time as may be required for the hard water to pass through the supply pipe 6 and container 3 and to wash therefrom the salt solution. As shown more particularly in Fig. 6 the discharge trough 20 is of such a length that it will be simultaneously in communication with the discharge pipes 8 of three water softening units. The forward end of this discharge trough is so arranged with relation to the salt supply pipe 18 that it will be brought into communication with the discharge pipes 8 of a water softening unit just prior to the time that the salt pipe 18 moves out of communication with the supply compartment 10 for that unit. This is for the reason that it requires some time for the salt solution to pass from the supply compartment 10 through the pipe 6 and container 3 to the discharge pipes 8, and the soft water is permitted to flow into the tank 16 until the salt solution has substantially reached the discharge pipe 8. The relative positions of the discharge trough 20 and salt pipe 18 may, of course, be varied to insure the discharge of all salt solution into the discharge trough. The length of the trough is such that the liquid from each softening unit will be delivered to the discharge trough for a period of time sufficient to enable the hard water delivered to the unit to thoroughly wash the mineral and remove all salt solution therefrom.

The salt supply pipe 18 and the discharge trough 20 are moved in timed relation one to the other and in the present instances they are rotatably mounted in fixed relation one to the other. To this end the trough 20 is carried by arms 25 which are rigidly secured to a vertical hollow shaft 26 which is rotatably mounted at its upper end in a bearing 27 carried by a base plate 28 which in turn is supported upon a transverse frame member 29 carried by the casing 1. The salt supply trough 19, which carries the pipe 18, is also rigidly secured to this shaft so that the rotation of the shaft will cause the pipe and the trough to rotate slowly about the series of water softening units. The shaft 26 may be rotated in any suitable manner but I prefer to utilize the hard water which is delivered to the apparatus for this purpose. To this end the hard water is introduced into the apparatus by means of a main supply pipe 30 which is controlled by a valve 31 and which discharges through a suitable casing 32 into the distributing vessel 13. Mounted in the casing 32 is a water motor, or water wheel, 33 so arranged that the water discharged from the pipe 30 will impinge against the blades thereof and cause the wheel to rotate. The wheel is mounted on a shaft 34 to which is secured a worm 35 which meshes with a worm wheel 36. The worm wheel 36 is mounted on a shaft 37 to which is secured a second worm 38 which meshes with a worm wheel 39 on the shaft 26. In this manner the speed of rotation of the water wheel is greatly reduced before the movement reaches the shaft 26 and this shaft is rotated very slowly.

The regenerating solution may be supplied to the delivery device 19 from any suitable source of supply and, in the present mechanism, I have provided at one side of the casing a salt tank 40 adapted to contain a relatively large quantity of salt and to which water is supplied for the purpose of creating the salt solution. The water is delivered to the salt tank by a supply pipe 41 which is connected with the main water supply pipe 30 in advance of the valve 31 and discharges into the salt tank near the bottom thereof, so that the water will flow upwardly through the salt and prevent the same from packing. The salt solution pipe 42 leads from the upper portion of the salt tank 40 above the level of the salt therein to the delivery apparatus for regenerating solution. This pipe is preferably provided with a strainer 43. In order to maintain the level of the salt solution substantially constant at a point above the pipe 42 I have arranged in the upper portion of the salt tank 40 a chamber 44 which is in open communication with the interior of the salt tank by means of openings 45. Mounted in this chamber is a float 46 which is connected with a valve 47 in the water supply pipe 41 and which opens and closes this valve according to the level of the water in the salt tank.

The flow of salt solution to the delivery device is controlled by a valve 48 and in order to maintain a substantially uniform flow of solution to the delivery device I have interposed between the pipe 42 and the delivery trough or device 19 for the salt solution a regulating device similar in character to that shown and described in my co-pending application Serial No. 743,385, filed October 13, 1924. This device comprises a receptacle 49 having a closure 50 which is secured thereto by a pin or rod 51 extending through the bottom wall thereof and threaded into the closure. Slidably mounted on this rod 51 is a float 52 which is preferably hinged to the casing and, in the present instance, is connected by means of a hinge 53 with the closure 50. This closure is provided with a nipple 54 by means of which it may be connected with the pipe 42 and the nipple is provided with a valve seat which is adapted to be engaged by a needle valve 55 which is supported on a finger 56 carried by the float and so arranged that as the float moves downwardly the valve will be opened and when the float moves upwardly the valve will be closed. The receptacle 49 has at its upper end and at one side thereof a laterally extending chamber 56[a] having in its lower wall an opening 57 arranged to discharge into the annular trough 19. Inasmuch as the float controlled valve 55 will maintain the solution in the receptacle at a substantially constant level the solution will flow through the outlet 57 to the annular receptacle 19 in substantially uniform quantities.

The controllng valve 31 for the main water supply pipe and the controlling valve 48 for the salt solution pipe 42 are automatically controlled according to the quantity of soft water contained in the soft water tank 16 and the controlling device is of such a character that it will quickly open and close those valves at the proper times. The controlling device here shown is substantially similar to that shown and described in my copending application Serial No. 11,435, filed February 25, 1925. Associated with each valve is a lever 58 pivotally supported between its ends upon a link 59 which is mounted at its lower end on a fixed support, and in the present instance on the valve casing. Each lever is connected at one end with the valve stem of the corresponding valve and is connected at its other end with a link 60, the upper ends of the two links being pivotally connected with a cross arm 61 mounted upon an actuating rod 62. This actuating rod is slidably mounted in a hollow plunger 63 which in turn is slidably mounted in a bearing 64 supported on a fixed support, such as the transverse frame member 29. A lever 65, preferably comprising parallel arms, is pivotally mounted on a bracket 66 which, in the present instance, is carried by the bearing 64, and this lever is connected at one end with the plunger 63 and at the other end with a rod 67 which extends through the shaft 26, which is made hollow for this purpose, and is connected at its lower end with a float 68 within the soft water tank 16, the arrangement being such that as the float rises or falls with the water in the tank 16, the plunger 63 will be moved in the opposite direction. Preferably the lever 65 is weighted, as shown at 69, to hold the float normally in its lowermost position. Mounted on the plunger are two movable members, such as bell crank levers 70, these levers being arranged on opposite sides of the actuating rod 62 and each having its lower arm pivotally connected with the plunger and the outer arms of the two levers being connected one to the other by springs 71 which tend to move the angles of the two levers one toward the other. Mounted at the angles of the levers are projections or pins 72 which cooperate with cam plates 73 projecting from the opposite sides of the actuating rod 62. If desired, these cam plates may comprise the opposite edges of a diamond shaped plate mounted on the actuating rod 62 and having lateral apices arranged in transverse alinement. With the parts in the position shown in Fig. 8 the valves are in their open positions so that water is flowing through the water softening units to the soft water tank 16 and the float 68 is rising therein. The pins 72 of the bell crank levers 70 have reached a position close to the apices of the cam plates and a slight further downward movement of the plunger 63 will carry these pins across the apices of the cam plates and they will then act upon the lower inclined surfaces of the cam plates and force the latter and the actuating rod 62 upwardly with relation to the plunger, thereby closing the valves in both the main water supply pipe and the regenerating solution pipe. As the water is drawn from the tank 16 and the float falls the plunger 63 will be moved upwardly until the pins again pass the apices of the cam plates and act upon the upper inclined surfaces thereof to force the actuating rod 62 downwardly and thereby open the valves. It will be noted that when the pins 72 are in engagement with the upper inclined edges of the cam plates they will support the plunger 63 in an elevated position to prevent the same from moving downwardly except as it is forced downwardly by the movement of the float.

The operation of the mechanism as a whole will be readily understood from the foregoing description of the several parts thereof and it will be apparent that when the supply of water in the soft water tank 16 has been lowered to a predetermined level the downward movement of the float 68 will serve to open the valves in the water supply pipe and the regenerating solution pipe. The hard water will be discharged through the casing 32, the distributor 13 and the several compartments 10 of the supply trough device 9 to the water softening units and will be discharged from these units through the outlet pipes 8 thereof. At the same time the salt solution will pass through the pipe 42 and regulator 49 to the salt supply trough 19 and thence through the pipe 18 to one of the compartments 10 and from this compartment through the particular softening unit with which this compartment is connected.

The water wheel 33 will be rotated by the hard water as it is discharged into the apparatus, thereby rotating the shaft 26 and carrying the delivery pipe 18 for the regenerating solution about the annular supply device 9, thus delivering salt solution successively to the several compartments and to the softening units. The rotation of the shaft 26 also carries the discharge trough 20 successively beneath the several discharge pipes 8 so that those units which contain regenerating solution will discharge into this trough and not into the soft water tank. The liquid flows from the discharge trough 20 through the annular trough 22 to the waste pipe 24. In this manner the several units are successively reconditioned but the major portion of the units are always in a condition to soften water and a constant supply of soft water is maintained. The action of the device is wholly automatic and requires no attention except the replenishing of the salt in the salt tank at the proper intervals and, as here shown, this salt tank is of such capacity that this need be done only at long intervals.

While I have shown and described one embodiment of my invention I wish it to be understood that I do not desire to be limited to the details thereof as various modifications may occur to a person skilled in the art.

Having now fully described my invention, what I claim as new and desire to secure by Letters Patent, is:—

1. In a water softening mechanism, a plurality of stationary containers for water softening material, means for delivering hard water to said containers, means for delivering regenerating solution to said containers successively, each of said containers having a single outlet for softened water and regenerating solution, a receptacle to receive softened water from said outlets, and means for diverting the regenerating solution from said receptacle as said regenerating solution is discharged through said outlets.

2. In a water softening mechanism, a plurality of stationary containers for water softening material, each having an outlet, means for delivering hard water to said containers, means for delivering regenerating solution to said containers successively, and a trough movable into positions to receive the regenerating solution as it is discharged from the outlets of the respective containers.

3. In a water softening apparatus, a plurality of stationary containers for water softening material each having an outlet, means for delivering hard water to said containers, a receptacle to receive softened water from said containers, a delivery device for regenerating solution movable into position to deliver regenerating solution successively to the several containers, and means for diverting the regenerating solution from said soft water receptacle as it is discharged from the outlets of said containers.

4. In a water softening mechanism, a plurality of stationary containers for water softening material each having an outlet, means for delivering hard water to said containers, a delivery device for regenerating solution movable into positions to deliver regenerating solution successively to the several containers, and a trough movable into a position to receive the regenerating solution as it is discharged from the outlets of the respective containers.

5. In a water softening mechanism, a plurality of stationary containers for water softening material, each having an outlet, means for delivering hard water to said containers, a delivery device for regenerating solution movable into positions to deliver regenerating solution successively to the several containers, a trough movable into a position to receive the regenerating solution as it is discharged from the outlets of the respective containers, and means for moving said delivery device and said trough in fixed relation one to the other.

6. In a water softening mechanism, a plurality of containers for water softening material each having an outlet, stationary means for delivering hard water to the respective containers, and a movable device for delivering regenerating solution successively to said containers.

7. In a water softening mechanism, a plurality of containers for water softening material, each having an outlet, stationary means for delivering hard water to the respective containers, a movable device for delivering regenerating solution to said containers, a movable discharge trough to receive the regenerating solution from said containers, and means for rotating said movable device and said movable trough in fixed relation one to the other to cause regenerating solution to be delivered successively to the several containers and to be discharged into said receptacle.

8. In a water softening mechanism, a plurality of containers for water softening material, each having an outlet, stationary means for delivering hard water to the respective containers, a movable device for delivering regenerating solution to said containers, a movable discharge trough to receive the regenerating solution from said containers, and means actuated by the hard water delivered to said mechanism for actuating said movable delivery device and said movable trough.

9. In a water softening mechanism, a plurality of containers for water softening material, each having an outlet, a supply device for water to be softened having separate compartments communicating with the respective containers, and means for delivering regenerating solution to said compartments.

10. In a water softening mechanism, a plurality of containers for water softening material, each having an outlet, an annular supply device for water to be softened having separate compartments communicating with the respective containers, and a delivery device for regenerating solution rotatably mounted for movement into communication with the several compartments successively.

11. In a water softening apparatus, a plurality of containers for water softening material, an outlet pipe leading from each of said containers, means for delivering water to be softened and regenerating solution to said containers, and a discharge trough movable into positions to receive the liquid successively from the several containers.

12. In a water softening apparatus, a plurality of containers for water softening material, means for delivering hard water to said containers near the bottom thereof, an outlet trough mounted in each receptacle and spaced from the top thereof, outlet pipes leading from the respective outlet troughs, and a discharge trough arranged to be moved into a position to receive the liquid discharged from any one of said outlet pipes.

13. In a water softening apparatus, a plurality of containers for water softening material, means for delivering hard water to said containers near the bottom thereof, an outlet trough mounted in each receptacle and spaced from the top thereof outlet pipes leading from the respective outlet troughs, a discharge trough arranged to be moved into a position to receive the liquid discharged from any one of said outlet pipes, a drain trough arranged to receive the liquid from said discharge receptacle in all positions of the latter, and a waste pipe leading from said drain trough.

14. In a water softening mechanism, a plurality of containers for water softening material each having an outlet, an annular supply device for water to be softened comprising a plurality of compartments communicating respectively with said containers, a vertical shaft arranged for rotation substantially centrally of said annular device, a delivery device carried by said shaft, a pipe connected with said device and having its discharge end arranged above said supply device, and means for supplying regenerating solution to the last mentioned delivery device.

15. In a water softening mechanism, a plurality of containers for water softening material, each having an outlet pipe, an annular supply device for water to be softened comprising a plurality of compartments communicating respectively with said containers, a vertical shaft arranged for rotation substantially centrally of said annular device, a delivery device carried by said shaft, a pipe connected with said device and having its discharge end arranged above said supply device, means for supplying regenerating solution to said delivery device, and a discharge trough carried by said shaft and movable therewith into positions beneath the discharge ends of the respective outlet pipes for said containers.

16. In a water softening mechanism, a plurality of containers for water softening material, each having an outlet pipe, an annular supply device for water to be softened comprising a plurality of compartments communicating respectively with said containers, a vertical shaft arranged for rotation substantially centrally of said annular device, a delivery device carried by said shaft, a pipe connected with said delivery device and having its discharge end arranged above said supply device, means for supplying regenerating solution to said delivery device, a discharge receptacle carried by said shaft and movable therewith into positions beneath the discharge ends of the respective outlet pipes for said containers, and means actuated by the water to be softened for rotating said shaft.

17. In a water softening mechanism, a plurality of containers for water softening material arranged substantially in a circle, a soft water receptacle arranged within said circle, each of said containers having an outlet pipe overhanging said soft water receptacle and adapted to discharge into the same, means for delivering water to be softened to the several containers, means for delivering regenerating solution successively to said containers, and a movable discharge trough arranged to be interposed successively between the several outlet pipes and said soft water receptacle.

18. In a water softening mechanism, a plurality of containers for water softening material arranged substantially in a circle, a soft water receptacle arranged within said circle, each of said containers having an outlet pipe overhanging said soft water receptacle and adapted to discharge into the same, means for delivering water to be softened to the several containers, means for delivering regenerating solution successively to said containers, a movable discharge trough arranged to be interposed successively between the several outlet pipes and said soft water receptacle, annular trough supported adjacent to said soft water receptacle and arranged to receive a liquid from said discharge trough, and a waste pipe leading from said annular trough.

19. In a water softening mechanism, a plurality of containers for water softening material each having an outlet, means for delivering water to be softened to the several containers, a delivery delivery device for regenerating solution, a pipe leading from said delivery device and movable into positions to deliver regenerating solution successively to the several containers, and means for supplying regenerating solution to said delivery device in substantially uniform quantities.

20. In a water softening mechanism, a plurality of containers for water softening material, inlet pipes for hard water leading to each of said containers, an annular delivery device connected with the several inlet pipes and comprising a plurality of compartments each of which communicates with one of said inlet pipes, a distributor arranged above said annular device and adapted to discharge into the several compartments, and means for supplying water to be softened to said distributor.

21. In a water softening mechanism, a plurality of containers for water softening material each having an outlet, a supply device for delivering hard water to said containers, a receptacle to receive the soft water from said containers, a hollow shaft mounted for movement about a vertical axis, a device carried by said shaft for delivering regenerating solution successively to the several containers, a supply pipe for hard water connected with said supply device, a second pipe to supply regenerating solution to said delivery device, separate valves to control said pipes, means for actuating said valves, a float mounted in said soft water receptacle, a rod connected with said float and extending through said hollow shaft, and a lever connecting said rod with said valve actuating means.

22. In a water softening mechanism, a plurality of containers for water softening material, a device for supplying hard water to said containers, a tank to receive soft water from said container, a hard water supply pipe connected with said supply device, a valve in said pipe, an actuating device for said valve comprising a member operatively connected with said valve, a second member mounted for movement relatively to the first mentioned member, means connected with said second member to impart operative movement to the first mentioned member when said second member has been moved to a predetermined position with relation to the first mentioned member, and means controlled by the level of the water in said tank for actuating said second member 23. In a water softening mechanism, a plurality of containers for water softening material, a device for supplying hard water to said containers, a tank to receive soft water from said containers, a hard water supply pipe connected with said supply device, a valve in said pipe, an actuating rod operatively connected with said valve, a plunger having movement relatively to said actuating rod, means carried by said plunger for imparting movement to said rod when said plunger has been moved to a predetermined position, and means controlled by the level of water in said tank for actuating said plunger.

24. In a water softening mechanism, a plurality of containers for water softening material, a device for supplying hard water to said containers, a tank to receive soft water from said containers, a hard water supply pipe connected with said supply device, a valve in said pipe, an actuating rod operatively connected with said valve, plates carried by said rod and projecting from the opposite sides thereof, the edges of each of said plates converging outwardly, a plunger mounted for reciprocatory movement with relation to said actuating rod, movable members carried by said plunger and having parts to engage the edges of the respective plates, a spring acting on said members to move them one toward the other, whereby when said members have been moved past the points of greatest width on the respective plates they will act on the inclined edges of said plate and impart movement to said actuating rod with relation to said plunger and means controlled by the level of the water in said tank for actuating said plunger.

25. In a water softener mechanism, a plurality of containers for water softening material, a device for supplying hard water to said containers, a tank to receive soft water from said containers, a hard water supply pipe connected with said supply device, a valve in said pipe, an actuating rod operatively connected with said valve, plates carried by said rod and projecting from the opposite sides thereof, the edges of each of said plates converging outwardly, a plunger mounted for reciprocatory movement with relation to said actuating rod, movable members carried by said plunger and having parts to engage the edges of the respective plates, a spring acting on said members to move them one toward the other, whereby when said members have been moved past the points of greatest width on the respective plates they will act on the inclined edges of said plate and impart movement to said actuating rod with relation to said plunger, a lever operatively connected with said plunger, and a float arranged in said tank and operatively connected with said lever.

26. In a water softening apparatus, a container for water softening material, the upper surface of said water softening material being spaced from the top of said container, means for introducing hard water into said container near the bottom thereof, a troughlike structure arranged within said container above said water softening material to receive water from said container, and an outlet conduit communicating with said trough-like structure below the upper edge thereof and leading to the exterior of said container.

27. In a water softening apparatus, a container for water softening material, the upper surface of said water softening material being spaced from the top of said container, means for introducing hard water into said container near the bottom thereof, and an outlet communicating with said container above said water softening material and through which liquid is discharged by gravity, said outlet being so arranged that its point of communication with said container will be below the normal level of the liquid in said container, and a discharge trough movable into and out of a position to receive liquid from said outlet.

28. In a water softening apparatus, a container for water softening material, means for introducing hard water into said container near the bottom thereof, a trough-like structure arranged adjacent to said container, communicating therewith near the top thereof and having an outlet, and a discharge trough movable into and out of a position to receive liquid from said outlet.

29. In a water softening apparatus, a container for water softening material, means for introducing hard water or regenerating solution into said container near the bottom thereof, a troughlike structure arranged adjacent to said container, communicating therewith and having an outlet, a receptacle to receive softened water from said outlet, and a discharge trough movable into and out of a position to receive regenerating solution from said outlet.

30. In a water softening apparatus, a container for water softening material, means for introducing hard water or regenerating solution into said container near the bottom thereof, a troughlike structure arranged adjacent to said container, communicating therewith and having an outlet, a receptacle to receive softened water from said outlet, and means for diverting from said receptacle the regenerating solution which is discharged through said outlet.

31. In a water softening apparatus, a container for water softening material, means for introducing hard water or regenerating solution into said container near the bottom thereof, a troughlike structure arranged adjacent to said container, communicating therewith, and having an outlet, a receptacle to receive softened water from said outlet, a second receptacle, and means for diverting the regenerating solution from said container to said second receptacle.

32. In a water softening apparatus, a container for water softening material, a pipe leading to said container near the bottom thereof, a supply receptacle connected with said pipe, means for delivering hard water to said supply receptacle, and means for mixing regenerating solution with the water in said supply receptacle at intervals.

33. In a water softening apparatus, a container for water softening material, the upper surface of said water softening material being spaced from the top of said container, a pipe leading to said container near the bottom thereof, a supply receptacle connected with said pipe, means for delivering hard water to said receptacle, means for mixing regenerating solution with the water in said supply receptacle at intervals, and an outlet communicating with said container above said water softening material and through which liquid is discharged by gravity, said outlet being so arranged that its point of communication with said container will be below the normal level of the liquid in said container.

34. In a water softening apparatus, a container for water softening material, means for introducing hard water into said container near the bottom thereof, a pipe leading to said container near the bottom thereof, a supply receptacle connected with said pipe, means for delivering hard water to said supply receptacle, means for mixing regenerating solution with the water in said supply receptacle at intervals, to troughlike structure arranged adjacent to said container, communicating therewith near the top thereof and having an outlet, and a discharge trough movable into and out of a position to receive liquid from said outlet.

35. In a water softening apparatus, a container for water softening material, the upper surface of said water softening material being spaced from the top of said container, means for introducing hard water into said container near the bottom thereof, means for introducing regenerating solution into said container near the bottom thereof, a receptacle for soft water, a normally open outlet communicating with said container above said water softening material and through which liquid is discharged by gravity to said soft water receptacle, and means for diverting from said softening receptacle the regenerating solution which is discharged from said container.

36. In a water softening apparatus adapted to maintain a continuous supply of softened water, a container for a bed of water softening material, a supply conduit communicating with said container on one side of said bed of material during all operative periods of said apparatus, a service conduit receiving softened water discharged from said container on the other side of said bed of material, means for delivering hard water and regenerating solution to said supply conduit, a motor energized in response to a withdrawal of softened water through said service conduit, and means operated and controlled by said motor for causing wash water to be delivered by said delivery means to said container through said supply conduit for an interval determined by the rate of continued operation of said motor during the delivery of said wash water.

37. An automatic regenerative base exchange water softener capable of valveless regeneration and comprising one or more containers for water softening material with connections adapted to pass liquids therethrough, means for delivering water to the containers, means for delivering regenerating liquid to the containers, receiving means for softened water, separate receiving means for regenerative liquid running from the containers, mechanical means for successively shifting the relative positions of the containers and the receiving means for regenerative liquid and a motor operating said mechanical means and timing said shifting.

38. A regenerative base exchange water softening apparatus capable of valveless regeneration and adapted to soften water continuously, said apparatus comprising a series of containers for water softening material, means for delivering water to be softened and regenerating solution to said containers, said means being adapted to deliver water to all units of said series and to deliver regenerating solution successively to the several units, and a motor adapted in continuous operation to so control said delivery means as to cause each of said units in turn to receive regenerating solution for a period of time determined by the rate of motion of said motor.

39. A base exchange water softening apparatus capable of valveless regeneration and comprising a container for water softening material, a supply pipe to deliver water and regenerating solution to said container, a service pipe to receive water from said container, a drain pipe to receive regenerating solution and wash water from said container and means continuously moved at an adjusted fixed rate by flow of the water delivered to said container to cause water to pass to said supply pipe and through said container to said drain pipe for an interval determined by the adjusted fixed rate of said water flow and to then cause water to pass to said supply pipe and through said container to said service pipe.

40. A base exchange water softening apparatus capable of valveless regeneration and comprising a container for water softening material provided with liquid inlet means and with an outlet for liquids, a feeding device for supplying liquids to said inlet means, mechanical means for changing the relative positions of the container and the feeding device, said device being adapted upon changing said relative positions to feed and to discontinue feeding regenerating solution to said inlet means, and a motor for operating said mechanical means.

41. In a base exchange water softening apparatus capable of valveless regeneration and comprising a container for water softening material provided with an inlet for liquids and with liquid outlet means, a trough for receiving liquid from said outlet means, mechanical means for changing the relative positions of said container and said trough, said trough being adapted upon changing said relative positions to receive and to discontinue receiving liquid from said outlet means, and a motor for operating said mechanical means.

EDWARD T. TURNER.